Patented Nov. 5, 1929

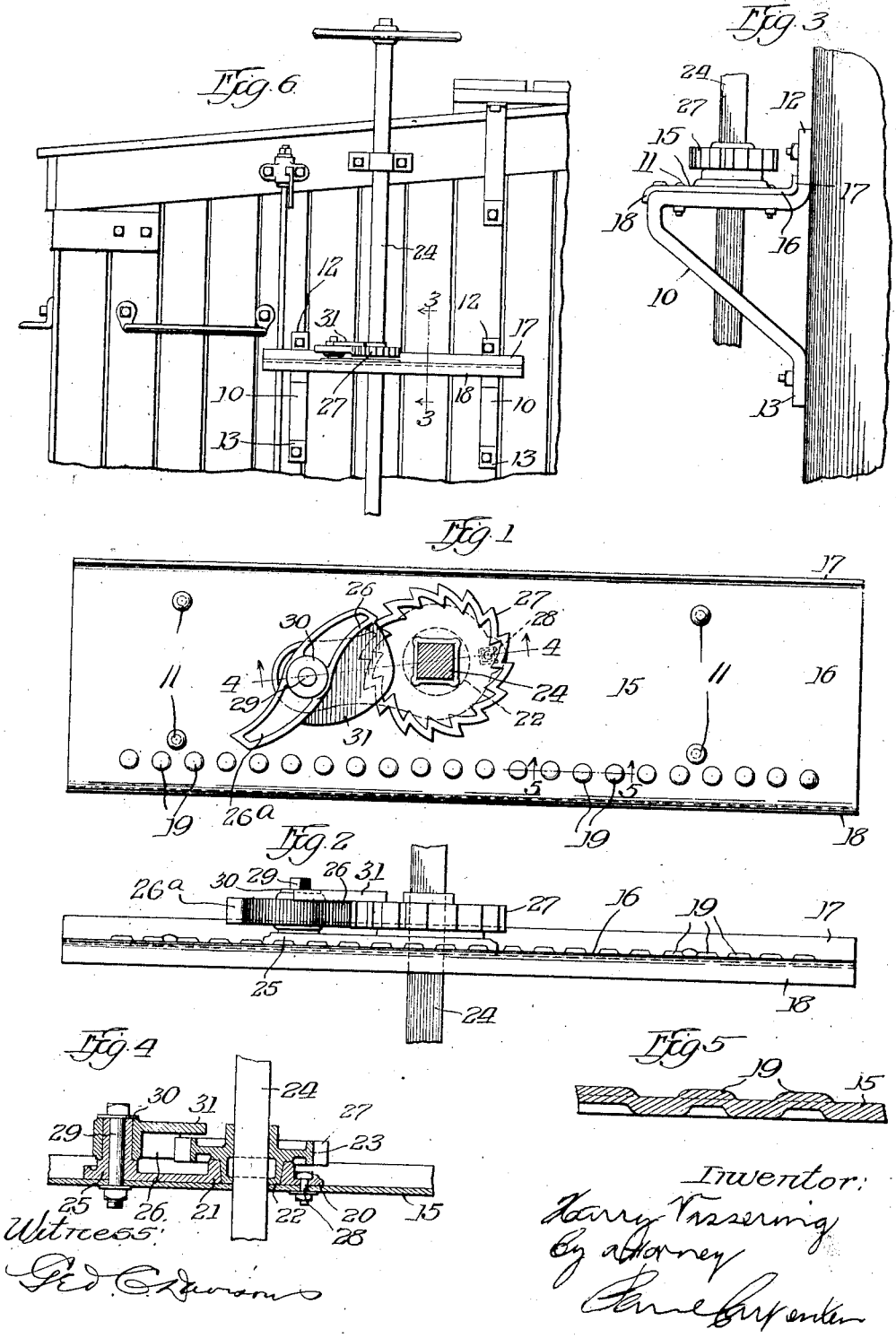

1,734,547

UNITED STATES PATENT OFFICE

HARRY VISSERING, OF KENILWORTH, ILLINOIS, ASSIGNOR TO VILOCO RAILWAY EQUIPMENT COMPANY, OF CHICAGO, ILLINOIS, A CORPORATION OF ILLINOIS

PRESSED-METAL BRAKE STEP

Application filed July 29, 1921. Serial No. 488,354.

My present invention relates to brake steps generally, and more particularly to the steps or plates commonly used for supporting the brake staff, the ratchet wheel and the dog generally employed in connection therewith in railway hand brake practice, and has special reference to the provision of an improved form of construction wherein the brake step may be made of a metal stamping and the construction simplified and the cost of manufacture thereby reduced.

The principal objects of my present invention are the provision of an improved brake step which may be made of pressed steel, and one wherein a minimum weight and number of castings, forgings and machine parts are required; the provision of a step having means for forming a better foot-hold for the trainman who operates the brake; the provision of a bracket and a brake step complementarily shaped; the provision with a Z-form brake step of means particularly adapted for supporting the said brake step from the car end wall; the provision of a foot-hold comprising abutment portions located with the outline of the brake step, and more particularly of abutment portions formed of a series of pressed up corrugations in longitudinal alignment; the provision of means for securing the brake staff assembly in position; the provision of an improved, simplified and relatively inexpensive form of brake step construction, together with such other objects as may hereinafter appear or be pointed out.

Figure 1 is a top plan view of the step of the present invention;

Figure 2 is a front edge view of the step of Figure 1;

Figure 3 is an elevational and edge view of the step of Figure 1;

Figure 4 is a transverse sectional view taken on the line 4—4 of Figure 1;

Figure 5 is an enlarged longitudinal section taken on the lines 5—5 of Figure 1;

Figure 6 is an elevational view of a car end having the step applied thereto.

Referring first to Figures 1 and 3 of the drawings, it will be observed that I have here shown my invention embodied in a brake step structure to be applied in the customary position and to be supported from the car end by means of the bracket indicated generally at 10, to which it is attached by means of bolts, 11. This bracket, 10, is made in an exaggerated V-form with the securing flanges 12 and 13, in substantial alignment and perforated for the reception of means for securing them to the car end wall. The brake step, 15, may be conveniently made from a flat commercial plate and is pressed so as to have it partake of the nature of an exaggerated Z-form with the extension web or shelf portion, 16, in contact with the horizontal portion of the bracket, 10, and with the upwardly extending flange, 17, thereof in contact with securing flange, 12. It will be noted that the flange, 17, of the brake step is shorter than the flange 12 of the bracket, 10. The depending flange, 18, of the step, 15, is in contact with the point of bend in the bracket 10.

The brake step, 15, is provided with the raised portions extending substantially longitudinally of the step and preferably parallel to the flange, 17, so that spaced abutments are formed between which the brakeman's feet can be positioned with provision against slipping in either direction, that is, either off the step or into the space between it and the car end. These raised portions are preferably in the form of pressed up nubs, 19, shown on an enlarged scale in Figure 5 and in effect form a row of corrugations spaced longitudinally of the brake step, 15, thus taken in connection with the upstanding and depending flanges, 17 and 18, materially strengthening the device as well as serving the functions appearing above among others.

Mounted upon and secured to this brake step, 15, is the brake operating assembly which comprises, as is clearly to be seen on reference to Figures 1, 2 and 4, the supporting or base member, 20, which is provided with the conical bearing 21, in which is journaled the hub, 22, of the ratchet wheel, 23, squared to receive the brake staff, 24.

The base, 20, is further provided with the upstanding hollow standard, 25, about which is mounted for free oscillation the pawl or dog, 26, with a tail portion, 26ª, and adapted to engage the teeth, 27, of the wheel, 23.

The base member, 23, is secured to the brake step, 15, by the bolt, 28, and also by the bolt, 29. This latter bolt, 29, serves the double function of not only securing the base, 23, to the step, 15, but also of holding the pawl, 26, in position and against rising on the standard, 25, a washer, 30, being interposed between the head of the bolt and the standard, 25, so as to hold down the pawl, 26.

For preventing the rising of the brake staff, 24, I have provided the pawl, 26, with the skirt portion, 31, of such shape and dimensions as to have a portion thereof overlie the ratchet wheel, 27, in all positions of the pawl.

Having thus described my invention and illustrated its use, what I claim as new and desire to secure by Letters Patent is—

In combination, with a car body, a brake step made of pressed sheet metal, a brake staff assembly base member secured thereto, a tapered socket in said base member, a brake staff extending through said socket, a ratchet wheel carried by the staff and having a tapered hub revolubly seated in said socket, and a pawl carried by said base member and provided with a skirt member which overlies the ratchet wheel at all positions of the pawl.

In testimony whereof I have hereunto signed my name.

HARRY VISSERING.